United States Patent
Hayashi et al.

(10) Patent No.: US 9,022,740 B2
(45) Date of Patent: May 5, 2015

(54) WIND TURBINE ROTOR BLADE LIGHTNING DISCHARGER AND WIND TURBINE GENERATOR EQUIPPED WITH THE SAME

(75) Inventors: Kentaro Hayashi, Tokyo (JP); Takehiro Naka, Tokyo (JP); Musashi Kimura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 617 days.

(21) Appl. No.: 13/358,902

(22) Filed: Jan. 26, 2012

(65) Prior Publication Data
US 2013/0195663 A1  Aug. 1, 2013

(51) Int. Cl.
*F03D 11/00* (2006.01)

(52) U.S. Cl.
CPC .......... *F03D 11/0033* (2013.01); *Y02E 10/722* (2013.01)

(58) Field of Classification Search
CPC ... F03D 11/0033; F03D 1/0675; B64C 11/18; B64C 2003/148; F05D 2240/32
USPC ................. 416/146 R, 235, 236 R, 241 R
See application file for complete search history.

(56) References Cited

U.S. PATENT DOCUMENTS 7,857,597 B2 * 12/2010 Anjuri et al. ............. 416/236 R
7,927,078 B2 *  4/2011 Parsania et al. ............. 416/235
8,061,986 B2 * 11/2011 Xiong ......................... 416/23
8,096,765 B2 *  1/2012 Fritz et al. .................... 416/62
8,258,773 B2 *  9/2012 Brnada ......................... 324/72

FOREIGN PATENT DOCUMENTS

| JP | 10047315 A | 2/1998 |
| JP | 2001050215 A | 2/2001 |
| JP | 2006052719 A | 2/2006 |
| JP | 2007100658 A | 4/2007 |
| JP | 2010223148 A | 10/2010 |
| WO | 2010016125 A1 | 2/2010 |
| WO | WO2012/055418 A1 * | 5/2012 ........ F03D 1/06 |

OTHER PUBLICATIONS

Office Action mailed Aug. 6, 2013 corresponds to Japanese patent application No. 2010-267716.
Decision to Grant a Patent mailed Apr. 8, 2014, corresponds Japanese patent application No. 2010-267716.

* cited by examiner

*Primary Examiner* — Ninh H Nguyen
(74) *Attorney, Agent, or Firm* — Kanesaka Berner & Partners (57) ABSTRACT

By means of a simple structure, lightning resistance is improved without increasing the level of fluid noise due to a lightning discharge member provided on a surface of a wind turbine blade. A wind turbine rotor blade lightning discharger, in which a diverter strip serving as a lightning discharge member protrudes from a surface of a wind turbine blade that extends in a radial direction from a rotor head supported in a freely rotatable manner, includes a noise suppressing structure that suppresses the generation of a Karman vortex, which causes noise, on the downstream side of the diverter strip with respect to an airflow that flows at the surface of the wind turbine blade during rotation of the wind turbine rotor blade.

10 Claims, 8 Drawing Sheets

WIND TURBINE ROTOR BLADE LIGHTNING DISCHARGER AND WIND TURBINE GENERATOR EQUIPPED WITH THE SAME

CROSS-REFERENCE TO RELATED APPLICATIONS

This application is based on Japanese Patent Application No. 2010-267716, the contents of which are incorporated herein by reference.

BACKGROUND OF THE INVENTION

1. Field of the Invention

The present invention concerns a wind turbine rotor blade in which a lightning discharge member is provided so as to protrude from the surface of a wind turbine blade, and in particular relates to a wind turbine rotor blade lightning discharger that is designed to suppress noise that the lightning discharge member generates and to a wind turbine generator equipped with the same.

2. Description of Related Art

Standard wind turbine generators are equipped with a wind turbine rotor blade having several wind turbine blades that extend in radial directions centered on a rotor head and have a configuration in which the rotor head is supported, at a shaft thereof, by a nacelle that is supported at the top of a tower so as to be capable of turning horizontally, and a generator disposed inside the nacelle is driven by the rotation of this wind turbine rotor blade to perform electrical power generation.

This kind of wind turbine generator tends to be struck by lightning, particularly on portions of the wind turbine blades, and therefore, a receptor (lightning rod member) serving as a lightning discharger is provided on each wind turbine blade, as disclosed in Japanese Unexamined Patent Application, Publication No. 2010-223148. In this case, the receptor is provided at the tip of the blade, which tends to be struck by lightning the most, and a lightning conductor (down conductor) which extends from the receptor passes through the interior of the wind turbine blade and is earthed to the ground via the nacelle and the tower, so as to guide lightning current that occurs when lightning strikes the receptor into the ground.

By providing such receptors, it is possible to quite reliably prevent lightning striking the tips of the blades; however, when lightning strikes a position shifted to the blade root side by a distance of several meters from the blade tip, the lightning current may destroy the outer skin of the blade and reach the interior of the blade, causing a risk of damage to the wind turbine blade. In future, with the increasing size of wind turbine generators, there will be a trend towards larger and larger blades, and in regions close to the shore, because the lightning attachment rate is lower overall due to the build up of salt compounds on the blade surfaces, there is a trend towards a greater risk of lightning striking parts other than the receptors provided at the tips of the blades.

Thus, numerous diverter strips, which are button-shaped metal pieces, are provided on the blade surface in areas other than the blade tip where the receptor is provided, and by means of these diverter strips, lightning current that occurs when lightning strikes areas other than the blade tip is allowed to flow along the surface of the wind turbine blade via the individual diverter strips and can be guided to the receptor. By doing so, each diverter strip does not need to be provided with a lightning conductor, and therefore, it is possible to improve the lightning resistance of the wind turbine blade with a simple structure.

However, when numerous diverter strips are disposed on the surface of the wind turbine blade as described above, because of the diverter strips which project from the surface of the wind turbine blade, when the wind turbine rotor blade rotates, Karman vortices (or Karman vortex streets) are generated on the downstream side of the diverter strips with respect to the airflow flowing at the surface of the wind turbine blade, and this causes annoying fluid noise. If the diverter strips are embedded so that the diverter strips are flush with the surface of the wind turbine blade, the problem of fluid noise can be eliminated. Doing so, however, reduces the lightning attachment performance of the diverter strips and their ability to transmit the lightning current, and depressions for embedding the diverter strips are inevitably produced in the surface of the wind turbine blade, which leads to force concentration in the periphery of these depressions, thus causing a decrease in strength of the wind turbine blade.

BRIEF SUMMARY OF THE INVENTION

The present invention has been conceived in light of the circumstances described above, and an object thereof is to provide a wind turbine rotor blade lightning discharger that can improve the lightning resistance with a simple structure without increasing the level of fluid noise due to lightning discharge members provided on the surface of a wind turbine blade, as well as a wind turbine generator equipped with the same.

In order to solve the problems described above, the present invention employs the following solutions.

A first aspect of a wind turbine rotor blade lightning discharger according to the present invention is a wind turbine rotor blade lightning discharger in which a lightning discharge member protrudes from a surface of a wind turbine blade that extends in a radial direction from a rotor head supported in a freely rotatable manner, including a noise suppressing structure configured to suppress the generation of a Karman vortex on the downstream side of the lightning discharge member with respect to an airflow that flows at the surface of the wind turbine blade during rotation of the wind turbine rotor blade.

With the above configuration, the generation of Karman vortices at the downstream side of the lightning discharge member that protrudes from the surface of the wind turbine blade by the airflow flowing at the surface of the wind turbine blade is suppressed by providing the noise suppressing structure, and therefore, fluid noise caused by the generation of Karman vortices is inhibited.

In a second aspect of a wind turbine rotor blade lightning discharger according to the present invention, the noise suppressing structure in the first aspect is an arrayed structure in which a plurality of the lightning dischargers are arrayed on the surface of the wind turbine blade in a meandering fashion in a direction along a flow direction of the airflow, and the spacing between the plurality of lightning discharge members matches the spacing at which the Karman vortices would be generated.

With the above configuration, on the downstream side of the lightning discharge member at the most upstream side with respect to the airflow that flows at the surface of the wind turbine blade, the next lightning discharge member is disposed at a position where the Karman vortices would alternately be generated, and therefore, the generation of Karman vortices is inhibited. Accordingly, the production of noise caused by the generation of Karman vortices is inhibited. Note that Karman vortices are not easily generated behind the lightning discharge member at the extreme downstream side with respect to the airflow. This is because the lightning discharge members arrayed in a meandering fashion on the upstream side disturb the airflow.

For example, the fluid noise of Karman vortices generated on the downstream side of a single lightning discharge member is a single frequency, that is to say, a pure tone, which tends to be perceived as noise by the human ear; however, the sound produced by the airflow generated on the downstream side of a plurality of lightning discharge members arrayed in a meandering fashion, as described above, is wideband sound, which has a timbre of the same quality as the noise that the wind turbine blades produce, and therefore tends not to be perceived as noise by the human ear. Accordingly, the level of fluid noise is not increased.

In a third aspect of a wind turbine rotor blade lightning discharger according to the present invention, of the plurality of lightning discharge members in the second aspect described above, the size of the lightning discharger on the downstream side with respect to the flow direction of the airflow is smaller than the lightning discharger on the upstream side.

With the above-described configuration, the generation of Karman vortices behind the lightning discharge member at the upstream side is inhibited by the lightning discharge members at the downstream side with respect to the airflow flowing at the surface of the wind turbine blade, and furthermore, the lightning discharge members at the downstream side are smaller than the lightning discharge member at the upstream side; therefore, the size of the Karman vortices generated by the lightning discharge members at the downstream side is reduced, thereby reducing the level of fluid noise of the Karman vortices produced from the plurality of lightning discharge members as a whole.

In a fourth aspect of a wind turbine rotor blade lightning discharger according to the present invention, the plurality of lightning discharge members in the above-described second aspect or third aspect are disposed with nonuniform spacings. By doing so, the airflow at the downstream side of the lightning discharge member at the upstream side with respect to the airflow flowing at the surface of the wind turbine blade tends to become turbulent, and therefore, the Karman vortices which would alternately be generated with uniform spacing on the downstream side of the lightning discharge member at the upstream side are easily made to decay. Accordingly, it is possible to contribute to a reduction in the level of fluid noise caused by Karman vortices.

In a fifth aspect of a wind turbine rotor blade lightning discharger according to the present invention, the noise suppressing structure in the above-described first aspect is a structure in which the shape of the lightning discharge member is a shape having left-right asymmetry with respect to the flow direction of the airflow. By doing so, a speed difference occurs in the airflows flowing on both sides of the lightning discharge members, which makes the airflow on the downstream side of the lightning discharge member turbulent, and Karman vortices are not easily generated; therefore, it is possible to suppress fluid noise caused by the generation of Karman vortices.

In a sixth aspect of a wind turbine rotor blade lightning discharger according to the present invention, the noise suppressing structure in the above-described first aspect is a structure in which the shape of the lightning discharge member is a shape that is streamlined with respect to the flow direction of the airflow. Accordingly, the airflow at the downstream side of the lightning discharge member is rectified, the generation of Karman vortices is prevented, and it is possible to suppress fluid noise.

In a seventh aspect of a wind turbine rotor blade lightning discharger according to the present invention, the lightning discharge member in any of the above-described first to sixth aspects is disposed in close proximity to a leading edge of the wind turbine blade. Because the airflow velocity in the vicinity of the leading edge of the wind turbine blade is low, Karman vortices are not easily generated on the downstream side of the lightning discharge member, thus making it possible to effectively suppress the generation of fluid noise.

In an eighth aspect of a wind turbine rotor blade lightning discharger according to the present invention, the lightning discharge member in any of the above-described first to seventh aspects is a diverter strip that allows a lightning current to flow along the surface of the wind turbine blade so as to be guided to an earthing member provided in the wind turbine blade. By doing so, there is no need to provide lightning conductors in the diverter strips, and therefore, it is possible to keep lightning damage to the wind turbine blades to a minimum by means of a simple structure.

In another aspect of a wind turbine rotor blade lightning discharger according to the present invention, the noise suppressing structure in any of the above-described first to eighth aspects is applied in an area up to 20% of a blade length from a tip of the wind turbine blade. Because the level of noise produced by the wind turbine blades is increased in proportion to the sixth power of the radius of the wind turbine blades, the level of fluid noise is highest in the area up to 20% of the blade length from the tip of the blade. Thus, by employing the noise suppressing structure only in the area up to 20% from the tip of the blade, the placement of the lightning discharge members etc. in the other portions can be performed comparatively freely, and this makes it possible to improve the lightning resistance without increasing the level of fluid noise.

A wind turbine generator according to another aspect of the present invention is equipped with the wind turbine rotor blade lightning discharger according to each of the above-above described aspects. By doing so, each of the effects and advantages described above can be afforded.

As described above, with the wind turbine rotor blade lightning discharger according to the present invention, as well as the wind turbine generator provided with the same, it is possible, by means of a simple structure, to improve the lightning resistance without increasing the level of fluid noise due to lightning discharge members provided on the surface of the wind turbine blade.

DETAILED DESCRIPTION OF THE INVENTION

Embodiments of a wind turbine generator according to the present invention will be described below based on the drawings.

First Embodiment

Figure 1:
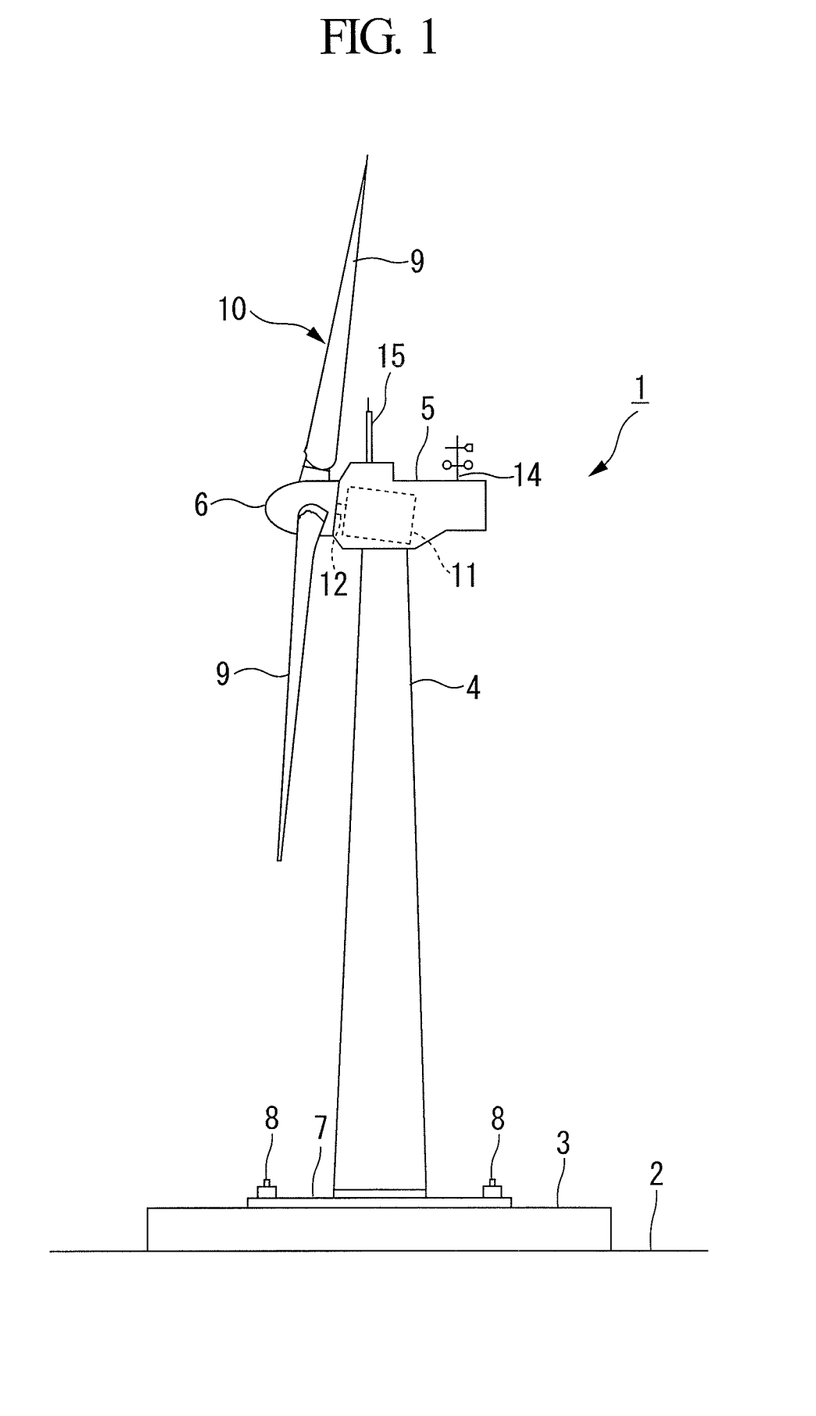
FIG. 1 is a side view showing an example of a wind turbine generator to which a wind turbine rotor blade lightning discharger according to the present invention can be applied.

FIG. 1 is a side view of an example of a wind turbine generator in which a wind turbine rotor blade lightning discharger according to the present invention can be employed. This wind turbine generator 1 includes, for example, a tower 4 erected on a reinforced-concrete base 3 disposed on the ground 2, a nacelle 5 disposed at the top end of the tower 4, and a rotor head 6 supported on the front end of the nacelle 5 so as to be freely rotatable around a rotor shaft in an approximately horizontal transverse direction.

The tower 4 is of a steel-tube monopole construction. A baseplate 7 made of, for example, steel plate, is secured to the bottom end of the tower 4, and this baseplate 7 is securely fastened to the base 3 with a number of anchor bolts 8. A plurality of (e.g., three) radially extending wind turbine blades 9 are attached to the rotor head 6 to form a wind turbine rotor blade 10, a generator 11 is accommodated inside the nacelle 5, and a rotor shaft 12 of the rotor head 6 is connected to a main shaft of the generator 11 via a gear box (not shown). Thus, the force of external wind hitting the wind turbine blades 9 is converted into a rotation force that rotates the wind turbine rotor blade 10 and the rotor shaft 12 to drive the generator 11, thus generating electricity.

The nacelle 5 can turn together with the wind turbine rotor blade 10 in the horizontal direction at the top end of the tower 4. A wind direction/speed measuring device 14 for measuring the peripheral wind direction and speed values and a lightning rod 15 for avoiding lightning strikes are disposed at suitable places (e.g., the upper portion) on the outer peripheral surface of the nacelle 5. The nacelle 5 is controlled by a driving system and a control system (not shown) so as to always point upwind, thereby efficiently generating electricity. The nacelle 5, the wind turbine blades 9, etc., are formed by, for example, FRP molding.

Figure 2:
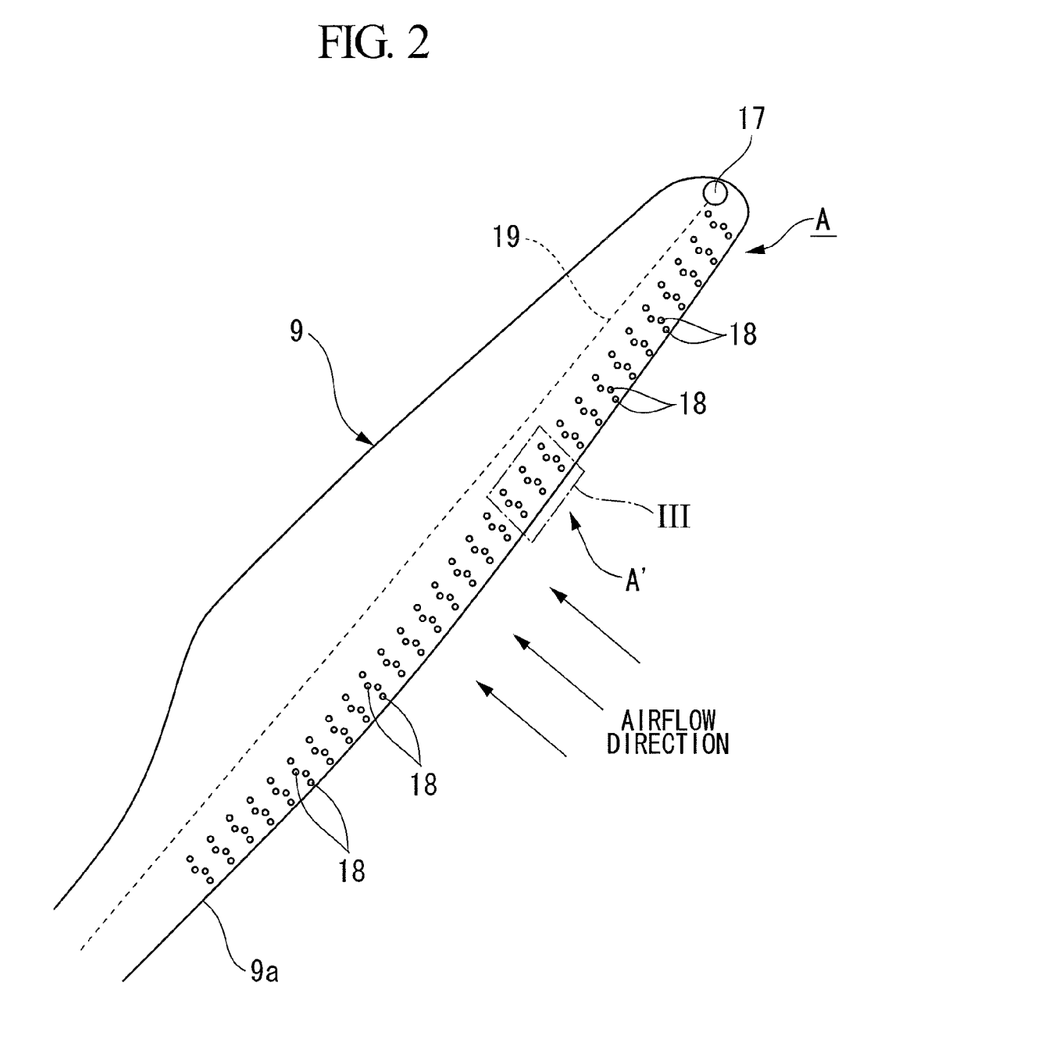
FIG. 2 is a perspective view showing, in a magnified view, a wind turbine blade of the wind turbine generator shown in FIG. 1.

FIG. 2 is a perspective view showing a magnified view of one of the wind turbine blades 9. A lightning discharger A according to the present invention is provided on the surface of each wind turbine blade 9. In this lightning discharger A, a single receptor 17 and multiple diverter strips 18 serving as lightning discharge members are provided on the surface of the wind turbine blade 9. The receptor 17, which is a known lightning discharge member (lightning rod member), is provided at a blade tip of the wind turbine blade 9, which has the greatest tendency to be struck by lightning, and is generally formed in a circular shape with a diameter of several centimeters, or in a shape following the form of the blade tip. A lightning conductor (down conductor) 19 extending from this receptor 17 passes through the interior of the wind turbine blade 9 and is earthed to the ground via the nacelle 5 and the tower 4 so as to guide a lightning current occurring when lightning strikes the receptor 17 into the ground.

On the other hand, the diverter strips 18, which are also known lightning discharge members, are generally formed in the shape of nickel-plated discs (button shaped) with a diameter of a few millimeters and a thickness of 1 mm or less, or rectangular shapes etc., and are bonded to a region on the surface of the wind turbine blade 9 where the receptor 17 is not provided, that is, a region parallel to the longitudinal direction except for the blade tip region, with a highly weather-resistant adhesive etc. Therefore, the numerous diverter strips 18 appear to protrude in a scattered manner on the surface of the wind turbine blade 9.

Although the lightning conductor 19 is not connected to each diverter strip 18, because a large number of the metal diverter strips 18 are provided over a wide area in this way, if lightning strikes a location other than the receptor 17, the lightning current is allowed to flow along the surface of the wind turbine blade 9 via the plurality of diverter strips 18 and can be guided to the receptor 17, which is connected to the lightning conductor (down conductor) 19. Accordingly, it is possible to prevent damage to the wind turbine blade 9 caused by a lightning strike.

If a large number of the diverter strips 18 protrude from the blade surface of the wind turbine blades 9, as described above, during rotation of the wind turbine rotor blade 10, Karman vortices (or Karman vortex streets) are generated on the downstream side of the diverter strips 18, with respect to the airflow flowing at the surface of the wind turbine blades 9, and these cause annoying fluid noise. Therefore, in the lightning discharger A in the present invention, a noise suppressing structure is provided for suppressing the generation of Karman vortices on the downstream side of the diverter strips 18, with respect to the airflow flowing at the surface of the wind turbine blades 9, during rotation of the wind turbine rotor blade 10.

Figure 3:
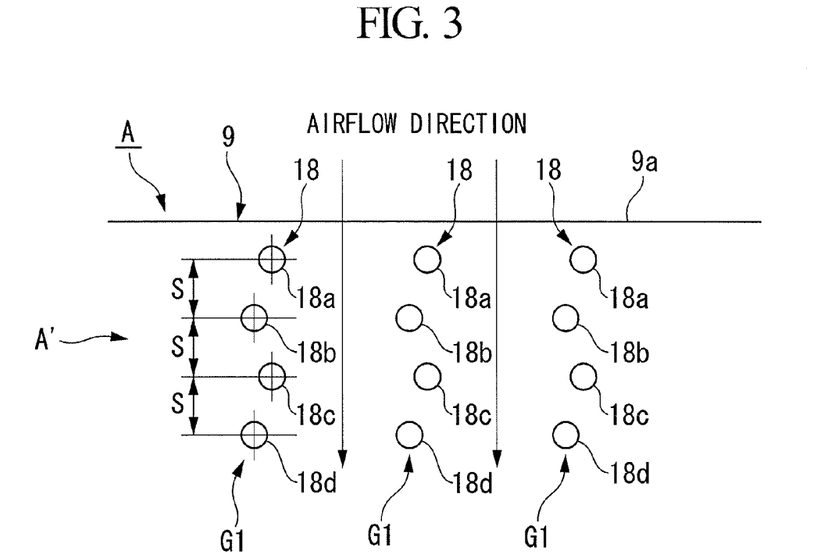
FIG. 3 is a diagram of a first embodiment of the present invention in which a portion III in FIG. 2 is enlarged.

FIG. 3 is a diagram showing a noise suppressing structure A', which is a first embodiment of the present invention, in which part III in FIG. 2 is enlarged. As shown in FIG. 3, the diverter strips 18 provided on the surface of the wind turbine blade 9 form groups G1 each composed of, for example, four diverter strips 18, and a plurality of these groups G1 are disposed along the longitudinal direction of the wind turbine blade 9. The spacing between the groups G1 is 1/10th or less the diameter of the diverter strips 18, for example, about 1 mm. Note that, in FIG. 3, the reference signs for the diverter strips 18 in each group G1 are 18a, 18b, 18c, and 18d from the leading edge 9a of the wind turbine blade 9. Thus, the four diverter strips 18a to 18d in each group G1 are arrayed in a meandering fashion along the direction parallel to the flow direction of the airflow that flows at the surface of the wind turbine blade 9.

Each group G1 is provided in close proximity to the leading edge of the wind turbine blade 9. In close proximity to the leading edge of the wind turbine blade 9 means the area from the leading edge 9a of the wind turbine blade 9 to a portion where the thickness of the wind turbine blade 9 is largest (close to the lightning conductor 19), as shown in FIG. 2.

Figure 4:
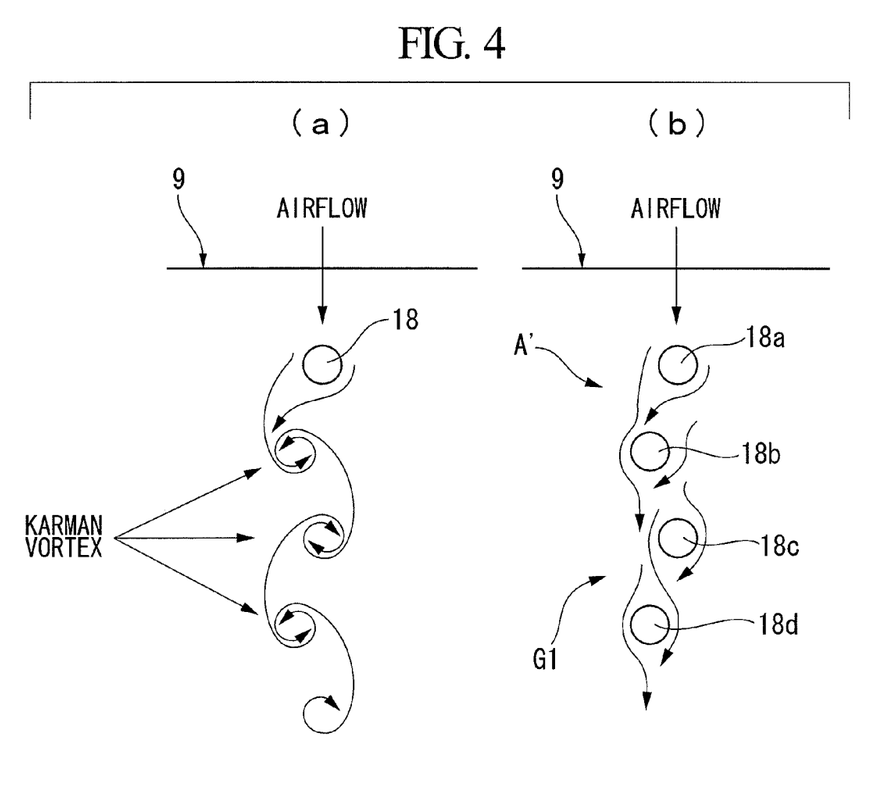
FIG. 4 is a diagram showing; (a) a state in which Karman vortices are generated behind a single diverter strip; (b) a state in which Karman vortices decay due to a plurality of diverter strips arrayed in a meandering fashion.

As shown in (a) of FIG. 4, if a single diverter strip 18 is provided on the surface of the wind turbine blade 9, alternating Karman vortices are generated on the downstream side of the diverter strip 18, as described above, thereby generating fluid noise. Therefore, in the present invention, as shown in FIG. 3 and (b) of FIG. 4, the spacing S between the four diverter strips 18a to 18d approximately matches the spacing at which the Karman vortices would be generated. More concretely, in the case where the shapes of the diverter strips 18a to 18d are circles (short columns), Karman vortices are periodically generated at a spacing two times greater than the diameter thereof, and therefore, the diverter strips 18a to 18d are preferably disposed with the above-described spacing S set to two times the diameter thereof.

As described above, in the lightning discharger A according to the present invention, a plurality of the diverter strips 18 are arrayed in groups on the surface of the wind turbine blade 9, and the noise suppressing structure A' for suppressing the generation of Karman vortices, which cause noise, on the downstream side of the diverter strips 18 is provided; therefore, by means of a simple structure, it is possible to eliminate the risk of the airflow that flows at the surface of the wind turbine blades 9 causing Karman vortices on the downstream side of the diverter strips 18, thus increasing the level of fluid noise, while at the same time improving the lightning resistance afforded by the diverter strips 18.

In particular, with the plurality of (in this case, four) diverter strips 18a to 18d serving as one group G1, a plurality of these groups G1 are arrayed along the longitudinal direction at the leading edge of the wind turbine blade 9, the diverter strips 18a to 18d in each group G1 are arrayed in a meandering manner in a direction parallel to the flow direction of the relative wind, and the spacing S between each of the diverter strips 18a to 18d is set to match the spacing at which Karman vortices would be generated; therefore, on the downstream side of the diverter strip 18a at the extreme upstream side with respect to the airflow flowing at the surface of the wind turbine blade 9, the next diverter strip 18b is disposed at the position where the initial Karman vortex would be generated. Accordingly, the generation of the initial Karman vortex is inhibited, and the subsequent Karman vortices also cannot be generated, thus suppressing the generation of fluid noise which is caused by the generation of Karman vortices (a vortex street). Note that it is difficult for a Karman vortex to be generated on the downstream side of the diverter strip 18d at the trailing end relative to the airflow direction. This is because the airflow is disturbed by the diverter strips 18a to 18c arrayed in a meandering fashion on the upstream side thereof, which causes an uneven flow at both sides of the diverter strip 18d at the trailing edge.

Figure 5:
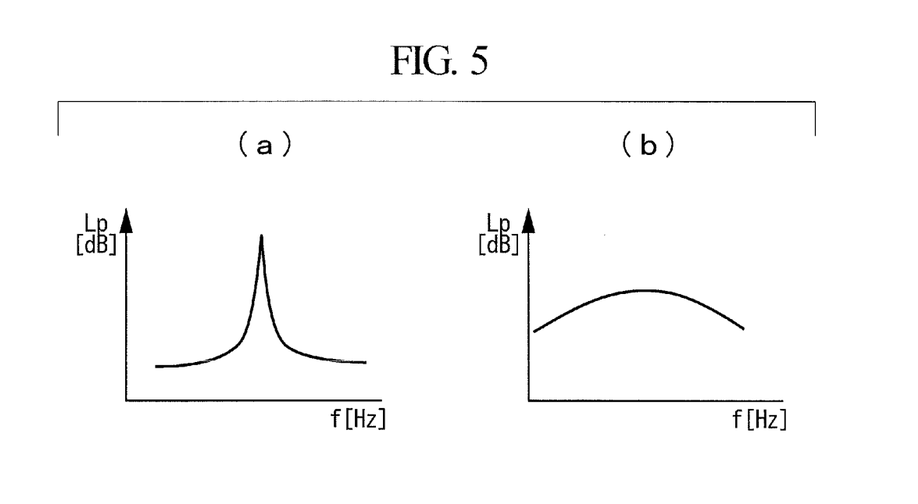
FIG. 5 is a diagram showing; (a) the frequency distribution of fluid noise in the case where Karman vortices are generated behind a single diverter strip; (b) the frequency distribution of fluid noise produced by an airflow generated on the downstream side of a plurality of diverter strips arrayed in a meandering fashion.

For example, with regard to the fluid noise of Karman vortices generated on the downstream side of a single diverter strip 18, as shown in (a) of FIG. 5, the noise level Lp at only a specific frequency f is high, that is to say, a pure tone, which tends to be perceived as noise by the human ear.

On the other hand, with regard to the noise generated by the airflow occurring on the downstream side of the plurality of diverter strips 18 arrayed in a meandering fashion as described above, as shown in (b) of FIG. 5, the distribution at that frequency f is wideband noise that is leveled-out on average, and the maximum noise level Lp is also low, producing a sound similar to the wind turbine sound which the wind turbine blades 9 make (a sound like cutting through the air); therefore, it tends not to be perceived as abnormal noise by the human ear. Thus, there is no increase in the overall fluid noise level of the wind turbine generator 1.

Multiple groups G1 including the four diverter strips 18a to 18d are disposed in close proximity to the leading edge along the longitudinal direction of the wind turbine blades 9; however, because the airflow speed in the vicinity of the leading edge of the wind turbine blades 9 is low, it is difficult for Karman vortices to be generated on the downstream side of the diverter strips 18a to 18d, and it is thus possible to more effectively suppress the generation of fluid noise at this point also.

In this embodiment, of the plurality of lightning discharge members provided on the wind turbine blade 9, because only the lightning discharge member disposed at the tip of the wind turbine blade 9 serves as the receptor 17 to which the lightning conductor 19 is connected, and the other lightning discharge members serve as the diverter strips 18 for allowing the lightning current to flow along the surface of the wind turbine blade 9 to be guided to the receptor 17 connected to the lightning conductor (down conductor) 19, there is no need to provide a plurality of lightning conductors 19 inside the wind turbine blade 9. Therefore, it is possible to keep lightning damage to the wind turbine blades 9 to a minimum by means of a simple structure.

Second Embodiment

Figure 6:
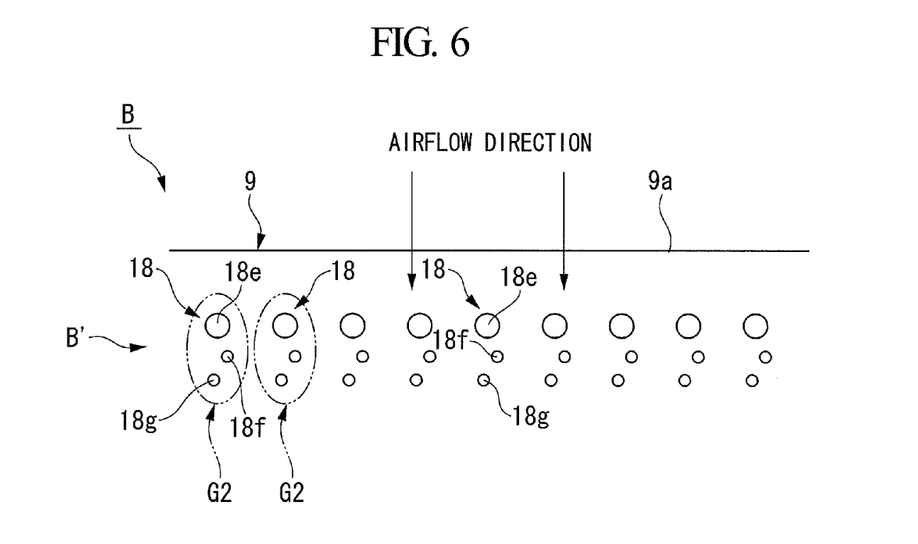
FIG. 6 is a diagram showing a second embodiment of the present invention.

FIG. 6 is a diagram showing a second embodiment of a lightning discharger according to the present invention.

In a noise suppressing structure B' of a lightning discharger B in this second embodiment, the diverter strips 18 serving as the plurality of lightning discharge members provided on the surface of the wind turbine blade 9 form groups G2 each composed of, for example, three diverter strips 18, and a plurality of these groups G2 are arranged along the longitudinal direction of the wind turbine blade 9. The individual groups G2 are arrayed in close proximity to the leading edge of the wind turbine blade 9, similarly to the groups G1 of diverter strips 18 in the first embodiment.

In each group G2, three disc-shaped (button-shaped) diverter strips 18e, 18f, and 18g are arrayed in a meandering fashion along the flow direction of the airflow that flows at the surface of the wind turbine blade 9. The spacing between these three diverter strips 18e, 18f, and 18g is set to approximately match the spacing at which Karman vortices would be generated, similar to the case of the first embodiment. Then, of these three diverter strips 18e, 18f, and 18g, the size (diameter) of the diverter strips 18f and 18g at the downstream side relative to the flow direction of the airflow is set to be smaller than that of the diverter strip 18e at the upstream side. For example, the diameter of the diverter strips 18f and 18g is set to be half the diameter of the diverter strip 18e. Note that the diameters may gradually decrease in the order 18e>18f>18g.

With this kind of noise suppressing structure B', the generation of Karman vortices behind the diverter strip 18e on the upstream side is inhibited by the diverter strips 18f and 18g on the downstream side relative to the airflow flowing at the surface of the wind turbine blade 9. Moreover, because the diverter strips 18f and 18g at the downstream side are smaller than the diverter strip 18e at the upstream side, the size of the Karman vortices that the diverter strips 18f and 18g at the downstream side generate is reduced, or they are inhibited from being generated, and therefore, it is possible to reduce the level of fluid noise produced by all three diverter strips 18e, 18f, and 18g.

Third Embodiment

Figure 7:
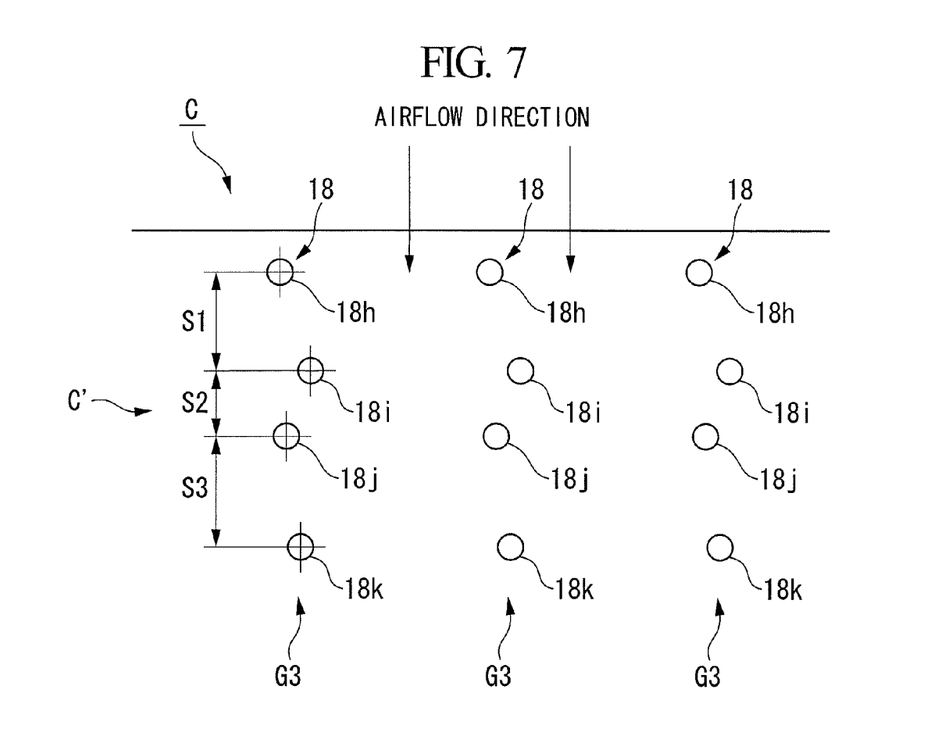
FIG. 7 is a diagram showing a third embodiment of the present invention.

FIG. 7 is a diagram showing a third embodiment of a lightning discharger according to the present invention.

In a noise suppressing structure C' of a lightning discharger C in this third embodiment, the diverter strips 18 serving as the plurality of discharger members provided on the surface of the wind turbine blade 9 form groups G3 each composed of, for example, four diverter strips 18, and a plurality of these groups G3 are arranged along the longitudinal direction of the wind turbine blade 9. The individual groups G3 are arranged in close proximity to the leading edge of the wind turbine blade 9.

A plurality of diverter strips 18h, 18i, 18j, and 18k in each group G3 are disc shapes (button shapes) of the same size; however, they may have different sizes, like the second embodiment, or different shapes. Then, spacings S1, S2, and S3 between these diverter strips 18h to 18k are set to be nonuniform, for example, satisfying S2<S1<S3.

With this kind of noise suppressing structure C', similarly to the noise suppressing structure A' in the first embodiment, the airflow on the downstream side of the diverter strip 18h at the upstream side relative to the airflow that flows at the surface of the wind turbine blade 9 tends to be turbulent, and therefore, Karman vortices that would alternately be generated with uniform spacing on the downstream side of the diverter strip 18h at the upstream side are easily made to decay. Thus, this can contribute to reducing the level of fluid noise caused by the Karman vortices.

Fourth Embodiment

Figure 8:
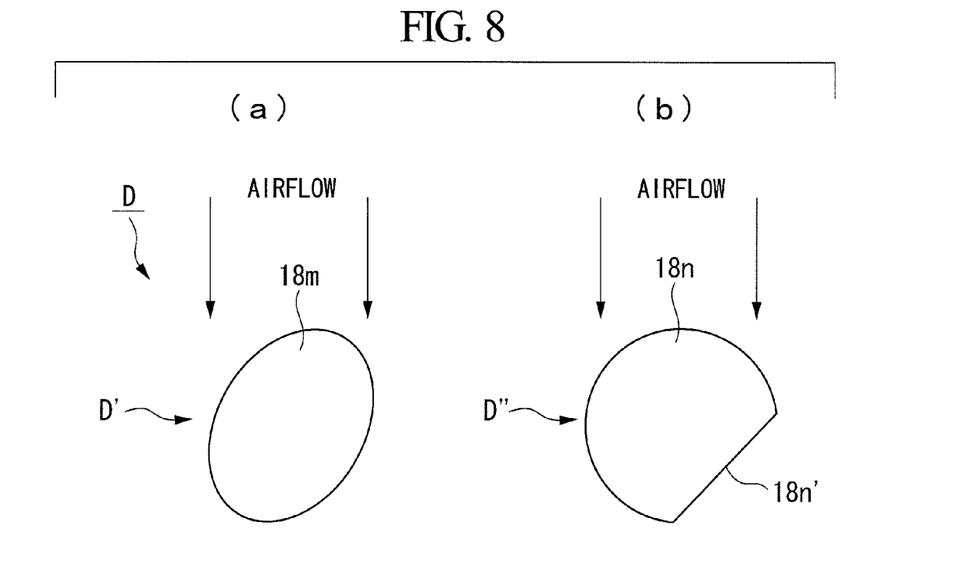
FIG. 8 is a diagram showing a fourth embodiment of the present invention; (a) a diagram in which the diverter strip is formed in an inclined elliptical shape so as to have a shape having left-right asymmetry with respect to the flow direction of the airflow; and (b) a diagram in which a circular diverter strip has a portion thereof cut off so as to have a shape having left-right asymmetry with respect to the flow direction of the airflow.

FIG. 8 is a diagram showing a fourth embodiment of a lightning discharger according to the present invention.

In noise suppressing structures D' and D" of a lightning discharger D in this fourth embodiment, the shapes of the diverter strips 18 are left-right asymmetric with respect to the flow direction of the airflow. For example, in the noise suppressing structure D' shown in (a) of FIG. 8, the diverter strip 18m is formed in an elliptical shape in plan view, and the long axis thereof is aligned so as to be inclined with respect to the flow direction of the airflow. Also, in the noise suppressing structure D" shown in (b) of FIG. 8, the diverter strip 18n has a shape obtained by cutting off part of a disc shape (button shape) in plan view, and a cut line 18n' thereof is disposed on the downstream side of the diverter strip 18n so as to be inclined with respect to the flow direction of the airflow. Note that the shapes are not limited to these shapes, and other shapes are permissible so long as they are left-right asymmetric.

If the shapes of the diverter strips 18m and 18n are set to be shapes having left-right asymmetry with respect to the flow direction of the airflow in this way, a speed difference occurs in the airflow flowing on both sides of the diverter strips 18m and 18n, which makes the airflow on the downstream side of the diverter strips 18m and 18n nonuniform, and Karman vortices cannot be generated. Therefore, it is possible to suppress fluid noise caused by the generation of Karman vortices.

Fifth Embodiment

Figure 9:
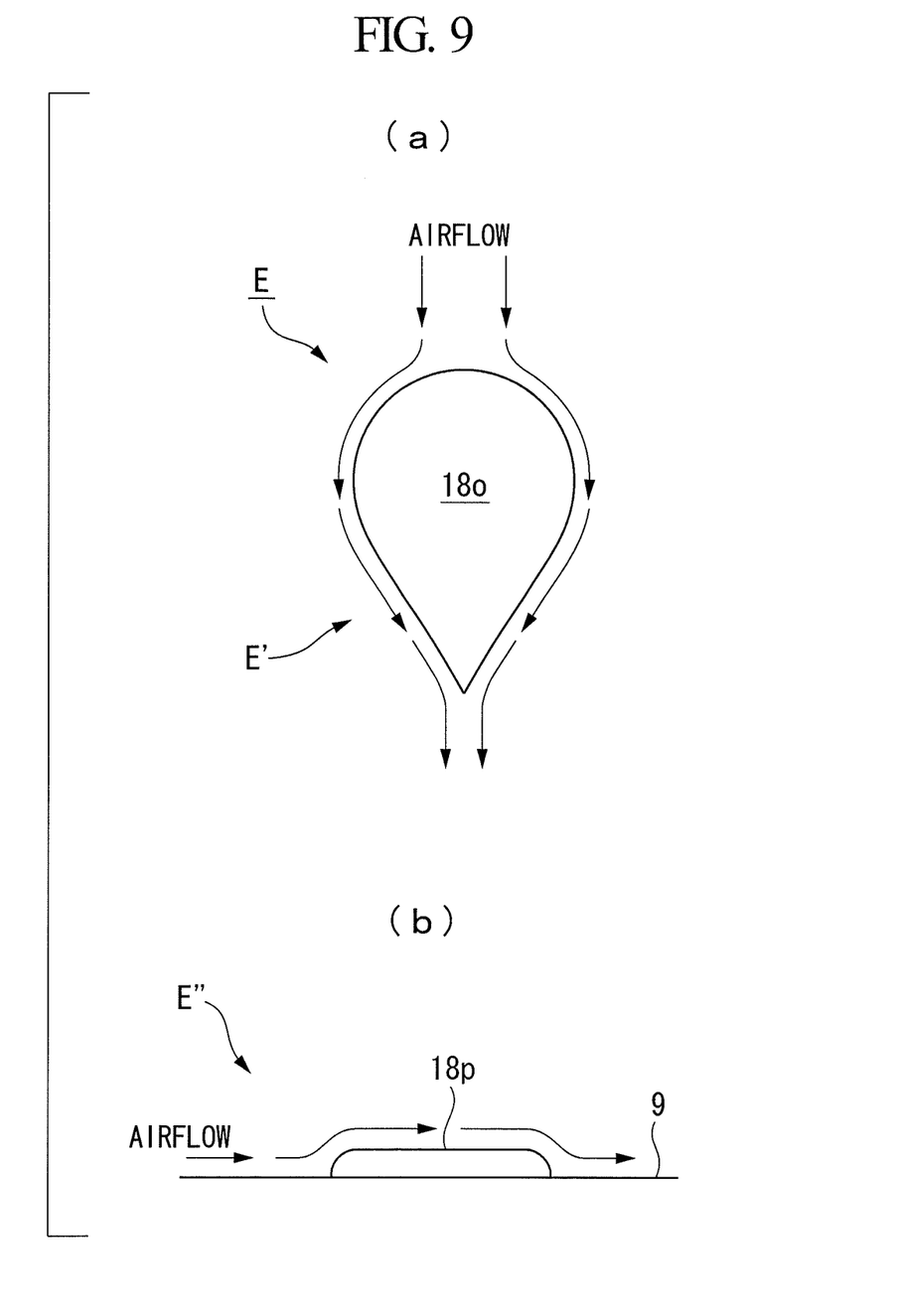
FIG. 9 is a diagram showing a fifth embodiment of the present invention; (a) a plan view in which the diverter strip is formed in a teardrop streamlined shape; (b) a side view in which shoulder portions of the diverter strip are rounded to form a streamlined shape.

FIG. 9 is a diagram showing a fifth embodiment of a lightning discharger according to the present invention.

In noise suppressing structures E' and E" of a lightning discharger E in this firth embodiment, the shapes of diverter strips 18o and 18p are streamlined shapes with respect to the flow direction of the airflow. For example, in the noise suppressing structure E' shown in (a) FIG. 9, the diverter strip 18o is formed in a teardrop streamlined shape in plan view. Also, in the noise suppressing structure E" shown in (b) in FIG. 9, the diverter strip 18p is formed in a streamlined shape obtained by having shoulder portions thereof rounded (sloped) as viewed from the side.

If the shapes of the diverter strips 18o and 18p are made in streamlined shapes with respect to the flow direction of the airflow in this way, the airflow at the downstream side of the diverter strips 18o and 18p is rectified, which prevents the generation of Karman vortices and makes it possible to suppress fluid noise.

Sixth Embodiment

Figure 10:
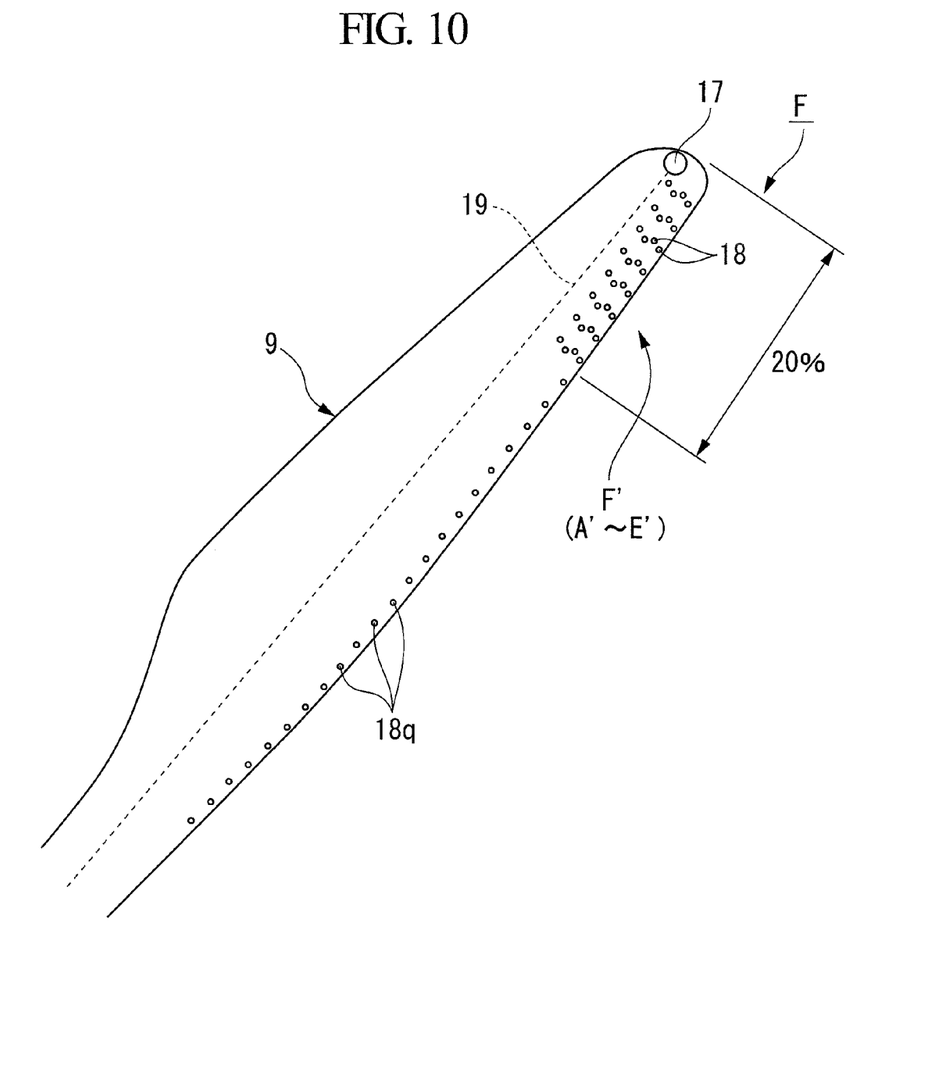
FIG. 10 is a magnified perspective view of a wind turbine blade showing a sixth embodiment of the present invention.

FIG. 10 is a magnified perspective view of the wind turbine blade 9 showing a sixth embodiment of a lightning discharger according to the present invention. In a lightning discharger F in this sixth embodiment, a noise suppressing structure F' thereof is employed only in a region up to 20% of the blade length from the tip of the wind turbine blade 9. The noise suppressing structure F' may be configured like any of the noise suppressing structures A' to E' of the first to fifth embodiments described above. In addition, it may be formed by combining the noise suppressing structures A' to E'.

In the portion other than this 20% region, a plurality of diverter strips 18q are arrayed with a prescribed spacing and in a fixed number; they are not set in any particular arrangement etc. for suppressing the generation of Karman vortices. For example, in FIG. 10, these diverter strips 18 are disposed in a single row along the leading edge of the wind turbine blade 9.

Figure 11:
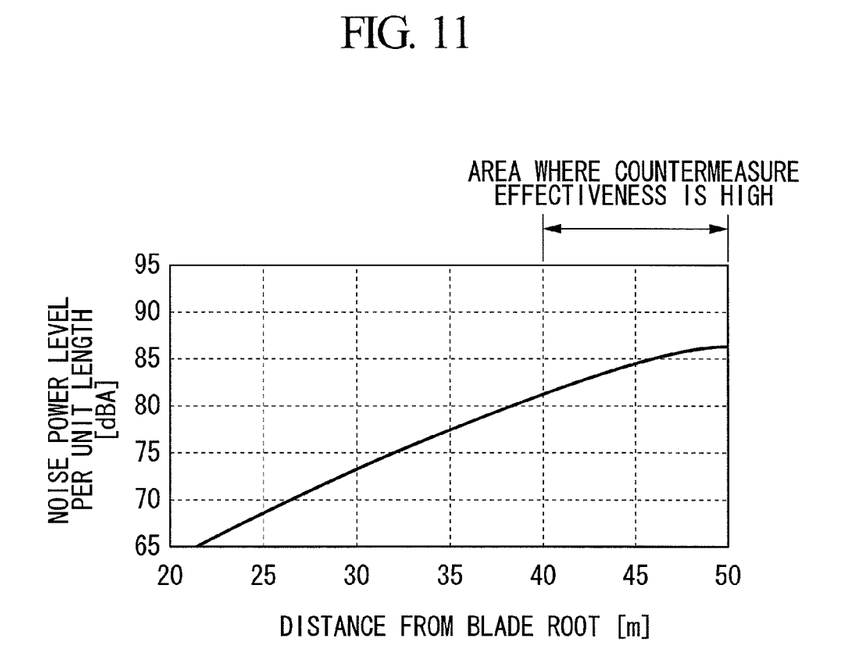
FIG. 11 is a diagram showing a graph of the relationship between the distance from a blade root of the wind turbine blade and the level of noise per unit length of the wind turbine blade.

The noise level produced by the wind turbine blades 9 increases in proportion to the sixth power of the radius of the wind turbine blades. Therefore, as shown in FIG. 11, the level of fluid noise is highest in the region up to 20% of the blade length from the tip of the blade. Thus, if the length of the wind turbine blades 9 is, for example, 50 m, by employing the noise suppressing structure F' (A' to E') only in the area covering a length up to 20% from the tip of the blade, that is, a 10 m area from the tip side, the placement of the diverter strips 18q etc. in the other portions can be performed comparatively freely, and this makes it possible to improve the lightning resistance without increasing the level of fluid noise.

By equipping the wind turbine generator 1 with the lightning dischargers A to F of the embodiments described above, it is possible to improve the lightning resistance of the wind turbine generator 1 by means of a simple structure, without increasing the level of fluid noise due to the diverter strips 18 provided on the surface of the wind turbine blades 9.

Note that the embodiments of the present invention are not restricted to only the first to sixth embodiments described above. For example, the first to sixth embodiments may be combined. Also, the lightning discharger according to the present invention is not limited to a lightning discharger for wind turbine rotor blades of wind turbine generators; it can also be applied to other types of wind turbine rotor blades.

What is claimed is:

1. A wind turbine rotor blade lightning discharger in which a lightning discharge member protrudes from a surface of a wind turbine blade that extends in a radial direction from a rotor head supported in a freely rotatable manner, comprising:

a noise suppressing structure configured to suppress the generation of a Karman vortex on the downstream side of the lightning discharge member with respect to an airflow that flows at the surface of the wind turbine blade during rotation of the wind turbine rotor blade.

2. A wind turbine rotor blade lightning discharger according to claim 1, wherein the noise suppressing structure is an arrayed structure in which a plurality of the lightning discharge members are arrayed on the surface of the wind turbine blade in a meandering fashion in a direction along a flow direction of the airflow, and spacing between the plurality of lightning discharge members matches spacing at which the Karman vortex would be generated.

3. A wind turbine rotor blade lightning discharger according to claim 2, wherein, of the plurality of lightning discharge members, the size of the lightning discharge member on the downstream side with respect to the flow direction of the airflow is smaller than the lightning discharger member on the upstream side.

4. A wind turbine rotor blade lightning discharger according to claim 2, wherein the plurality of lightning discharge members are disposed with nonuniform spacings.

5. A wind turbine rotor blade lightning discharger according to claim 1, wherein the noise suppressing structure is a structure in which the shape of the lightning discharge member is a shape having left-right asymmetry with respect to the flow direction of the airflow.

6. A wind turbine rotor blade lightning discharger according to claim 1, wherein the noise suppressing structure is a structure in which the shape of the lightning discharge member is a shape that is streamlined with respect to the flow direction of the airflow.

7. A wind turbine rotor blade lightning discharger according to claim 1, wherein the lightning discharge member is disposed in close proximity to a leading edge of the wind turbine blade.

8. A wind turbine rotor blade lightning discharger according to claim 1, wherein the lightning discharge member is a diverter strip that allows a lightning current to flow along the surface of the wind turbine blade so as to be guided to an earthing member provided in the wind turbine blade.

9. A wind turbine rotor blade lightning discharger according to claim 1, wherein the noise suppressing structure is applied in an area up to 20% of a blade length from a tip of the wind turbine blade.

10. A wind turbine generator comprising the wind turbine rotor blade lightning discharger according to claim 1.

* * * * *